US008675538B2

(12) United States Patent
Potkonjak

(10) Patent No.: US 8,675,538 B2
(45) Date of Patent: Mar. 18, 2014

(54) WIRELESS ONE-TO-ONE COMMUNICATION USING MULTICAST

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1178 days.

(21) Appl. No.: 12/433,706

(22) Filed: Apr. 30, 2009

(65) Prior Publication Data

US 2010/0278089 A1 Nov. 4, 2010

(51) Int. Cl.
*H04H 20/71* (2008.01)

(52) U.S. Cl.
USPC ............ 370/312; 370/328; 370/342; 370/343

(58) Field of Classification Search
USPC ................. 370/312, 313, 328, 338, 342, 343; 342/357.07; 375/260, 267; 455/67.13, 455/428; 714/751, 752, 776
See application file for complete search history.

(56) References Cited

U.S. PATENT DOCUMENTS

| | | | | |
|---|---|---|---|---|
| 6,353,739 | B1 * | 3/2002 | Davis ............................ | 455/428 |
| 6,975,879 | B1 | 12/2005 | Aalto et al. | |
| 2006/0045199 | A1 * | 3/2006 | Kim ............................. | 375/267 |
| 2006/0120477 | A1 | 6/2006 | Shen et al. | |
| 2007/0126585 | A1 | 6/2007 | Okunev et al. | |
| 2008/0168332 | A1 * | 7/2008 | Palanki et al. ................ | 714/776 |
| 2009/0034636 | A1 * | 2/2009 | Kotecha et al. .............. | 375/260 |
| 2009/0073035 | A1 * | 3/2009 | Percy et al. ............... | 342/357.07 |
| 2009/0147718 | A1 * | 6/2009 | Liu et al. ...................... | 370/312 |
| 2009/0258601 | A1 * | 10/2009 | Jauh ............................ | 455/67.13 |
| 2010/0023834 | A1 * | 1/2010 | Richardson et al. .......... | 714/751 |
| 2010/0100789 | A1 * | 4/2010 | Yu et al. ........................ | 714/752 |
| 2013/0195000 | A1 | 8/2013 | Shen et al. | |

FOREIGN PATENT DOCUMENTS

KR 2007-0086976 A 8/2007

OTHER PUBLICATIONS

International Search Report and Written Opinion, issued in International Patent Application No. PCT/US2010/03301, mailed Jun. 22, 2010, 11 pages.
Chu, Y.H. et al., "Enabling Conferencing Applications on the Internet using an Overlay Multicast Architecture," Proceedings of the 2001 ACM Conference of the Special Interest Group on Data Communication, Aug. 2001, 13 pages.
Andersen, D. et al., "Resilient Overlay Networks," 18th ACM Symposium on Operating Systems Principles, Oct. 2001, 15 pages.
Banerjee, S. et al., "Scalable Application Layer Multicast," Proceedings of the 2002 Conference on Applications, Technologies, Architectures, and Protocols for Computer Communications, Aug. 2002, 17 pages.
Castro, M. et al., "SplitStream: High-Bandwidth Multicast in Cooperative Environments," Proceedings of the Nineteenth ACM Symposium on Operating Systems Principles, Oct. 2003, 16 pages.
Dao, S. et al., "Semantic Multicast: Intelligently Sharing Collaborative Sessions," ACM Computing Surveys, Jun. 1999, vol. 31, No. 2, pp. 27-33.

(Continued)

*Primary Examiner* — Brian D Nguyen
*Assistant Examiner* — Toan Nguyen
(74) *Attorney, Agent, or Firm* — Brundidge & Stanger, P.C.

(57) ABSTRACT

Techniques are generally described for receiving a multicast signal at a plurality of receivers and using the received multicast signals to recover an one-to-one communication for a recipient. Other embodiments may be disclosed and claimed.

16 Claims, 10 Drawing Sheets

(56) References Cited

OTHER PUBLICATIONS

Myers, S. et al., "Experimental Investigation of IEEE 802.15.4 Transmission Power Control and Interference Minimization," Fourth Annual IEEE Communications Society Conference on Sensor, Mesh and Ad Hoc Communications and Networks, Jun. 2007, 10 pages.

Cerpa, A. et al., "Statistical Model of Lossy Links in Wireless Sensor Networks," Proceedings of the 4th International Symposium on Information Processing in Sensor Networks, Apr. 2005, 16 pages.

Cerpa, A. et al., "Temporal Properties of Low Power Wireless Links: Modeling and Implications on Multi-Hop Routing," Proceedings of the 6th ACM International Symposium on Mobile Ad Hoc Networking and Computing, May 2005, 12 pages.

Chu, Y.H. et al., "A Case for End System Multicast," Proceedings of ACM Sigmetrics, Jun. 2003, 15 pages.

International Preliminary Report on Patentability, issued in International Patent Application No. PCT/US2010/03301, mailed Nov. 10, 2011, 5 pages.

\* cited by examiner

214 ⟶ Original packet: 0 0 0 1 1 0 1 1 1 0
Receiver A: 0 0 0 0 1 1 1 1 0 0
Receiver B: 1 0 0 1 1 0 1 1 1 0
425 ⟶ Receiver C: 0 0 1 1 1 0 1 0 1 1
Decoded packet: 0 0 0 1 1 0 1 1 1 0

FIG. 4

Unicast Using Multicast

WIRELESS ONE-TO-ONE COMMUNICATION USING MULTICAST

BACKGROUND

Wireless communications have provided users with the ability to exchange information with enhanced mobility. The most ubiquitous example today of a wireless device is the cellular phone. Wireless communications now allow users of cell phones not only to communicate with others, but also to receive data fast enough to be able to download or stream videos, listen to music, connect to the internet and play games.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, where FIG. 4 shows a hypothetical original packet 214 as transmitted and a number of partially corrupted hypothetical packets received at a corresponding number of receivers, in accordance with various embodiments.

DETAILED DESCRIPTION OF EMBODIMENTS

Figure 1:
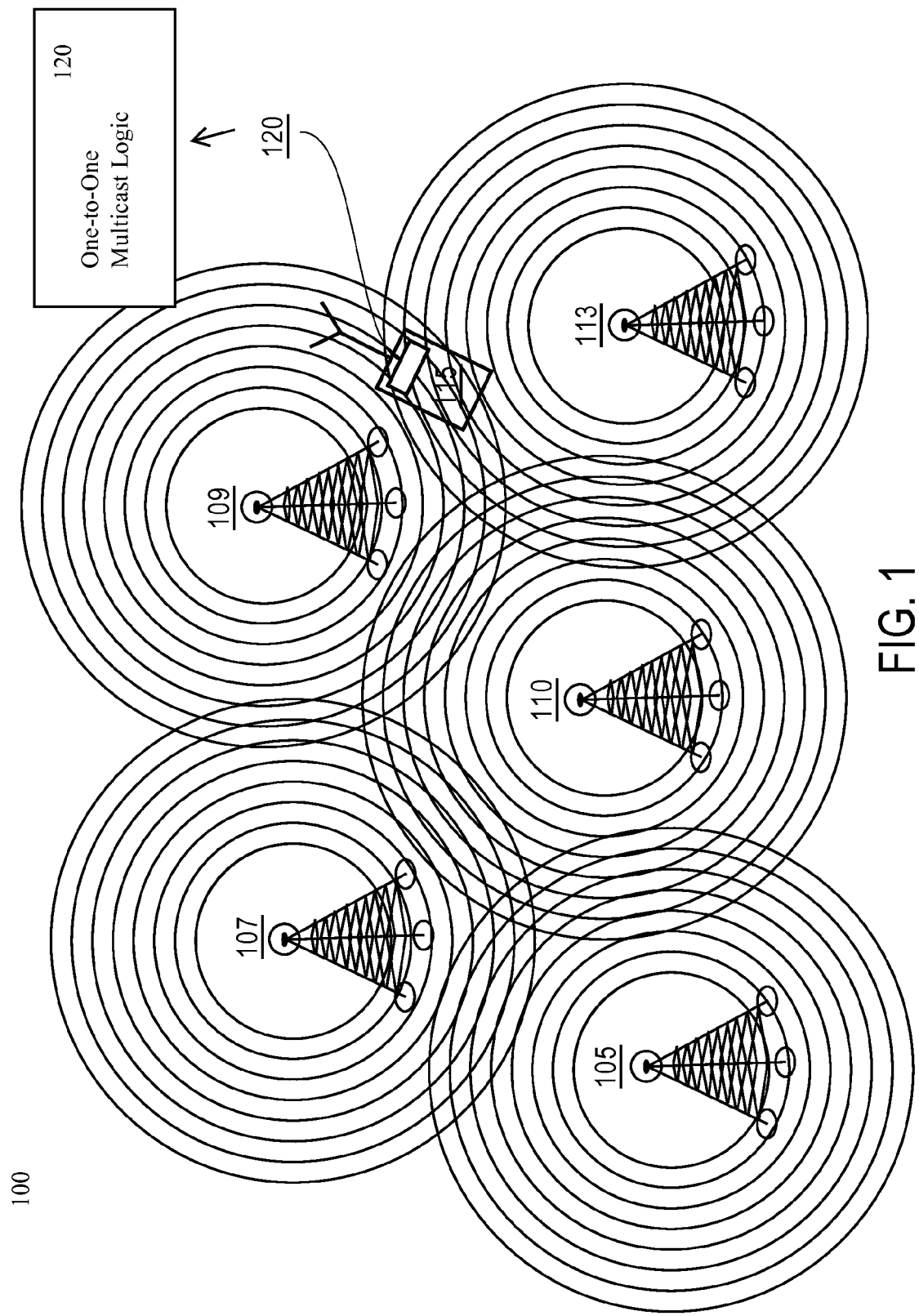
FIG. 1 illustrates an example operational environment, in accordance with various embodiments.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the FIGS., may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

Embodiments may provide methods, apparatuses, and systems for receiving at a plurality of receivers, a multicast signal wirelessly transmitted by a sender and for recombining the plurality of received multicast signals to recover the signal, the recovered signal to be transmitted by a transmitter as a unicast signal to a recipient. In various embodiments, the multicast signal may be transmitted in a manner or condition such that at least two receivers receive the multicast signal differently. In various embodiments, the multicast signal may be wirelessly transmitted at a power level that is based upon a number of receivers in the plurality.

FIG. 1 illustrates an example operational environment 100, in accordance with various embodiments. As shown, operational environment 100 may include a plurality of base stations 105, 107, 109, 110, and 113. Each of the plurality of base stations 105, 107, 109, 110, and 113 may include a respective cellular coverage area for transmitting and receiving a radiofrequency (RF) signal to and/or from wireless terminal or device 115. Wireless device 115 may include, for example, a cellular phone to transmit and/or receive the RF signal to and/or from one or more of the plurality of base stations 105, 107, 109, 110, and 113. In the embodiment shown, wireless device 115 may include a one-to-one multicast logic 120. In the embodiment, one-to-one multicast logic 120 may be configured to cause a wireless transmission of a multicast signal in a manner or condition such that at least two receivers of a plurality of receivers may receive separate instances of the multicast signal. In some embodiments, each of a plurality of receivers at one or more of the plurality of base stations 105, 107, 109, 110, and 113 may receive separate instances of the multicast signal and may forward the separate instances to a processor for recombination of the multicast signal. In some embodiments, one-to-one multicast logic 120 may be coupled to a radio unit (see FIG. 9) for transmitting and/or receiving RF signals to and/or from a plurality of receivers.

Wireless device 115 may include, in various example embodiments, a laptop computer, a personal digital assistant, a Motion Pictures Experts Group Audio-Layer 3 ("MP3") player, or other suitable device configured to transmit and/or receive RF signals. Thus, it should also be noted that FIG. 1 is only one example of an operational environment for embodiments of the disclosure. For example, in some embodiments, wireless device 115 may include a mobile radio frequency identifier (RFID) transmitter or device configured to multicast an RFID, where various receivers (not shown) other than base stations may be positioned or pre-positioned to receive one or more multicast RF signals to detect the RFID device. Wireless device 115 may also in some embodiments include sensors included in medical implanted devices where various receivers may be positioned to detect the medical implanted device.

Figure 2:
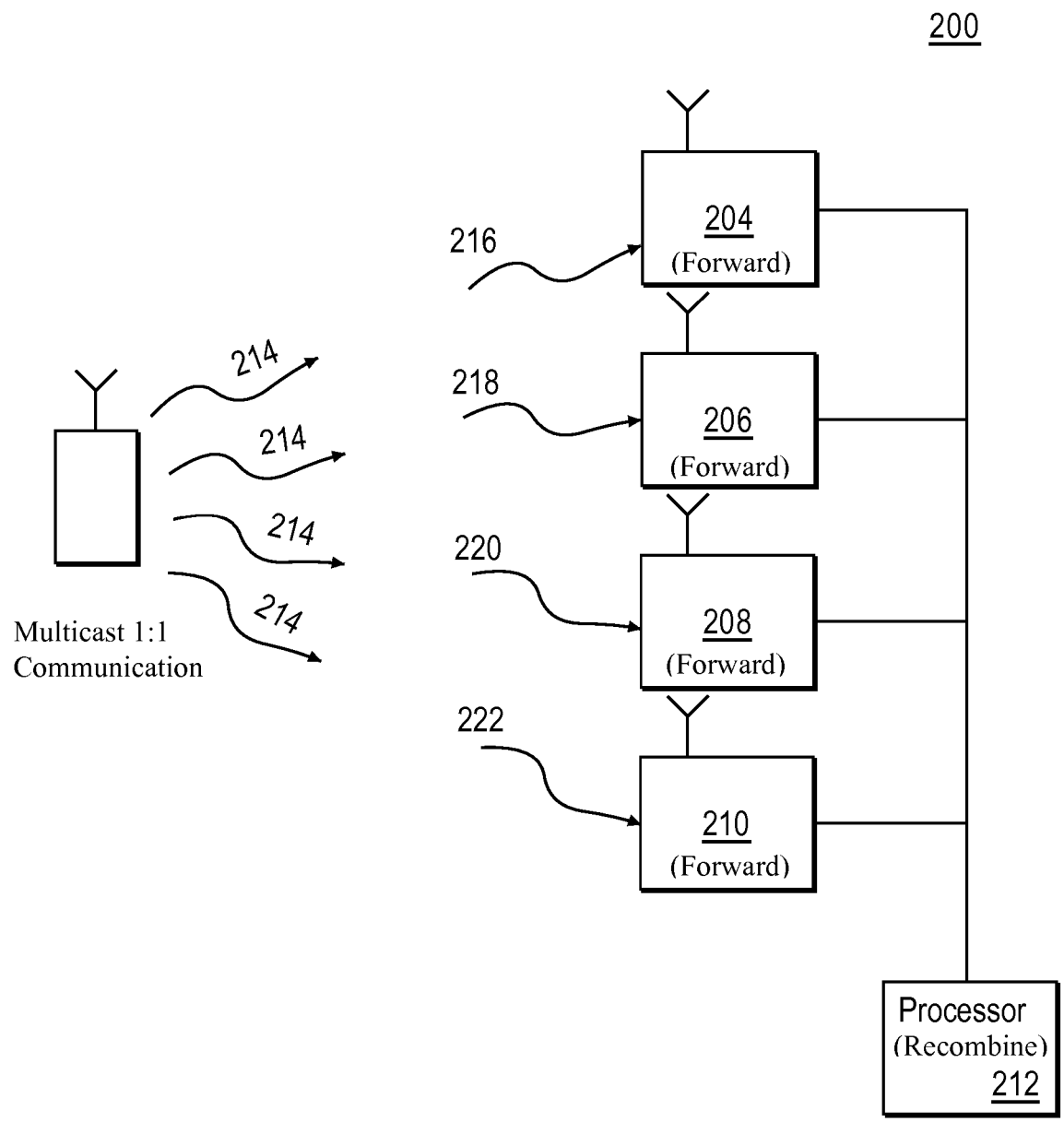
FIG. 2 is a block diagram of a wireless communication system that may be implemented in the operational environment of FIG. 1, in accordance with various embodiments.

Next, FIG. 2 is a block diagram of a wireless communication system 200, in accordance with various embodiments. In some embodiments, wireless communication system 200 may be implemented in the example operational environment 100 of FIG. 1. Wireless communication system 200 may include a plurality of receivers 204, 206, 208, and 210. In various embodiments, each of the plurality of receivers 204, 206, 208, and 210 may be included in a radio that may also include a transmitter. Each of the plurality of receivers 204, 206, 208, and 210 may receive a multicast of 1:1 communication signal 214 transmitted from wireless device 115. In various embodiments, multicast 1:1 communication signal 214 may be transmitted at a power level lower than a power level otherwise than usually employed for transmission of a unicast signal to a recipient. In some implementations, each of receivers 204, 206, 208, and 210 may be located at separate locations. For example, in the embodiment of FIG. 1, each of plurality of receivers 204, 206, 208, and 210 may be located at separate locations within a single base station or at separate locations within one or more different base stations, e.g. base stations 105, 107, 109, 111, or 113 of FIG. 1.

As discussed above, each of the plurality of receivers 204, 206, 208, and 210 may be located at separate locations unassociated with one or more base stations. In various embodiments, each of the plurality of receivers 204, 206, 208, and 210 may be coupled together with wired connections or wireless connections. In some embodiments, optical fiber connections may be used.

Thus, in the embodiment shown, multicast 1:1 communication signal 214 may be transmitted in a manner or condition such that at least two receivers of the plurality of receivers 204, 206, 208, and 210 may receive separate instances 216, 218, 220, and 222 of the multicast signal 214. Because of their separate locations, one or more of the plurality of receivers 204, 206, 208, and 210, may receive a high quality signal while other receivers of the plurality of receivers 204, 206, 208, and 210 may receive a corrupted signal or a lesser quality signal. Thus, separate instances 216, 218, 220, and 222 of the multicast signal 214 may vary in a reception quality of the multicast signal 214.

As shown in FIG. 2, each of plurality of receivers 204, 206, 208, and 210 may be coupled to a processor 212 so that the receivers may forward each of the respective plurality of received separate instances 216, 218, 220, and 222 of the multicast signal 214 to processor 212. Processor 212 may then recombine the separate instances 216, 218, 220, and 222 of the received multicast signal 214.

In various embodiments, recombining may include combining two or more differently corrupted versions of a packet to recover an original packet. In some embodiments, processor 212 may be arranged to determine whether a received packet is correct according to the original packet. Processor 212 may do so according to an error correction code (ECC) associated with a packet in one or more of separate instances 216, 218, 220, and 222 of the received multicast signal 214. In some embodiments, processor 212 or a decoder (not shown) separate from processor 212 may be arranged to decode received one or more of separate instances 216, 218, 220, and 222 of the received multicast signal 214.

Processor 212 may, in some embodiments, be arranged to select data packets that are confirmed to be correct from one or more of decoded separate instances 216, 218, 220, and 222 in order to reconcile the decoded received separate instances 216, 218, 220, and 222 and to recover the original packet. In other embodiments, an ECC may not be used, and, instead, an analog signal from each of received separate instances 216, 218, 220, and 222 may be derived using a digital-to-analog converter and then may be processed in a manner as to enable detection of differently corrupted versions of a packet in the received separate instances 216, 218, 220, and 222. Two or more of the differently corrupted versions of a packet may then be combined to recover the original packet. Thus, in some embodiments, processor 210 may recombine the plurality of received separate instances 216, 218, 220, and 222 of the multicast signal 214 to result in the recovery of the multicast signal 214. In this manner, in accordance with the present disclosure, multicast 1:1 communication signals may be transmitted and subsequently recovered in order to effect the transmission of a unicast signal to a recipient. In various embodiments, one or more of the plurality of received separate instances 216, 218, 220, and 222 of multicast signal 214 may include packets received on different frequencies or over parallel channels. In some embodiments, processor 212 may include one or more processors or processing elements.

Further, in some embodiments, processor 212 may be integrated with one or more of receivers 204, 206, 208, and 210. Thus, each of the plurality of received separate instances 216, 218, 220, and 222 may be initially processed at separate locations. In some embodiments, after initial processing and/or decoding, each of the received separate instances 216, 218, 220, and 222 may be forwarded to one of the processors at receivers 204, 206, 208, and 210, where that processor has been designated to recombine the plurality of received separate instances 216, 218, 220, and 222. Alternatively, each of plurality of received separate instances 216, 218, 220, and 222, after initial processing or decoding, may be forwarded to a host processor that is located at a location (not shown) separate from any of the plurality of receivers 204, 206, 208, and 210.

Figure 3:
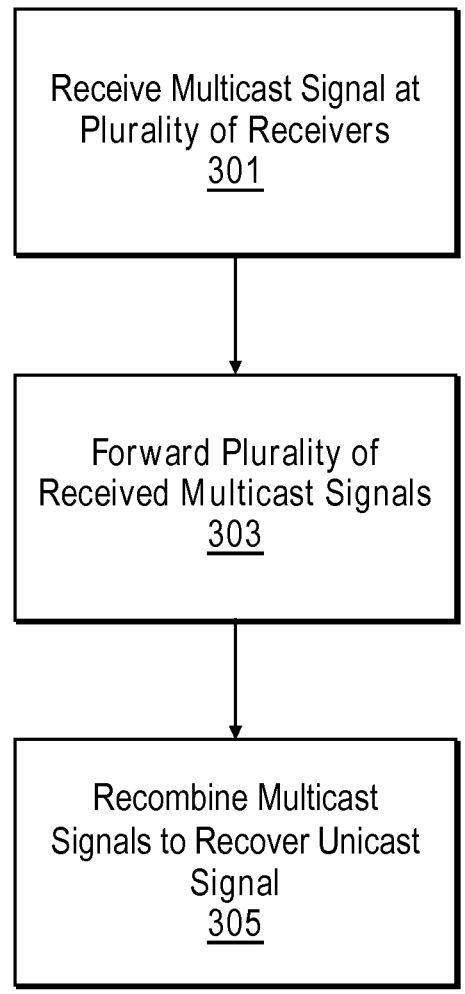
FIG. 3 is a flow chart illustrating an example method associated with the wireless communication system of FIG. 2, in accordance with various embodiments.

FIG. 3 is a flow chart illustrating an example method 300 associated with the wireless communication system 200 of FIG. 2, in accordance with various embodiments. The process illustrated in FIG. 3, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 3 may be practiced in various implementations. Method 300 may include one or more of blocks 301, 303 and/or 305.

At block 301 (receive multicast signal at plurality of receivers), a plurality of receivers may receive a multicast 1:1 communication signal wirelessly transmitted by a sender. In various embodiments, the multicast signal may be received at a plurality of receivers. In some embodiments, at least two of the receivers may receive the multicast signal under different conditions. For example, one of the receivers may receive a multicast signal that has been corrupted due to a relative location of the receiver and transmitter. Thus, in some embodiments, separate instances of a multicast signal may be received by various receivers.

Next, at block 303 (forward plurality of received multicast signals), the plurality of received multicast 1:1 communication signals or separate instances of a multicast 1:1 communication signal may be forwarded to a processor, such as processor 212.

At a block 305 (recombine multicast signals to recover unicast signal), the processor may then recombine the received multicast 1:1 communication signals to recover the original multicast 1:1 communication signal. In embodiments, the recovered multicast signal is a signal that is to be eventually transmitted by a transmitter to an intended recipient as a unicast signal. In embodiments, the transmitter may be included with the receiver as a transceiver or may be a separate transmitter in a different location than the receiver. The processor may be coupled to each of the plurality of receivers to receive and recombine the plurality of received multicast signals to recover the multicast signal. Recombining may include combining two or more differently corrupted versions of a packet to recover the original packet, as will be described in more details below with references to FIGS. 4 and 5.

FIG. 4 shows a hypothetical original packet 214 as transmitted and a number of partially corrupted hypothetical packets received at a corresponding number of receivers, in accordance with various embodiments. More specifically, FIG. 4 illustrates three partially corrupted hypothetical packets received at three different receivers A, B, and C (e.g., any three of receivers 204-210 of FIG. 2), located within the coverage areas of three different base stations (e.g. any three of base stations 105, 107, 109, 110, or 113 of FIG. 1) or locations within a single base station 105, 107, 109, 110, or 113. In the example shown, although each of the three received packets has at least some incorrect bits, an application of a majority rule for each bit may correctly recover the original packet (as transmitted) as decoded packet 425. For example, in the embodiment shown, the majority rule may indicate that each bit is recovered as indicated by the majority of the received multicast signals.

Figure 5:
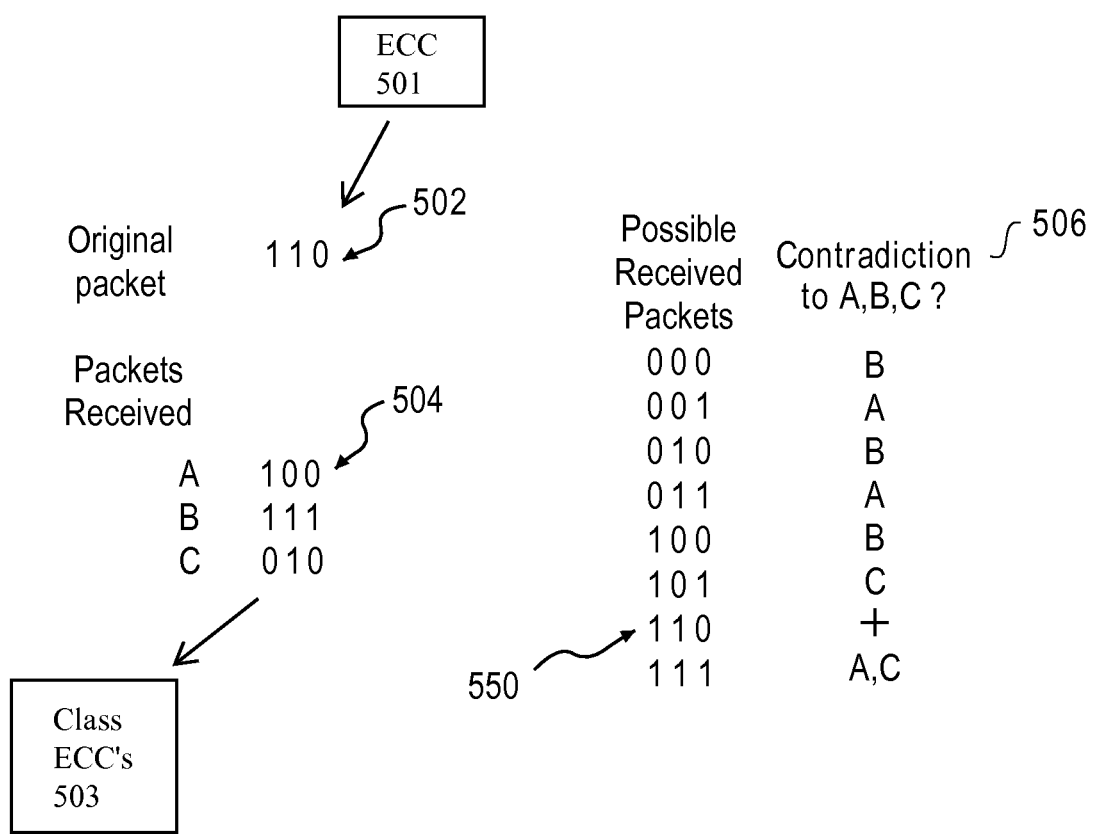
FIG. 5 illustrates an example recovery of another hypothetical original packet, in accordance with various embodiments.

FIG. 5 illustrates an example recovery of another hypothetical original packet, in accordance with various embodiments. In some embodiments, it may be determined whether a received packet is correct. Such a determination may be made according to an ECC 501 associated with a received packet in one or more of the received multicast signals. In the embodiment shown, at 502, the multicast 1:1 communication signal as originally transmitted may include a 11 bit pattern augmented by an ECC parity bit 0. If receivers A, B, and C receive packets having bits as indicated at 504 under the assumption that at most one bit may be received incorrectly, the original packet in the multicast 1:1 communication signal as originally transmitted may be recovered. In particular, as shown in table 506, other possibilities of received bit patterns other than the correct bits 550 may be contradictory to possible received packets. In some embodiments, a new class of ECC's 503 may be determined in accordance with observed noise models to recover the packet. In some embodiments, an ECC or class of ECC's 503 may be determined in accordance with a probability density function for active receivers where there are an unknown number of active receivers. In some embodiments, a new ECC may be used to recover a packet from packets received at a plurality of receivers at a plurality of time slots.

Figure 6:
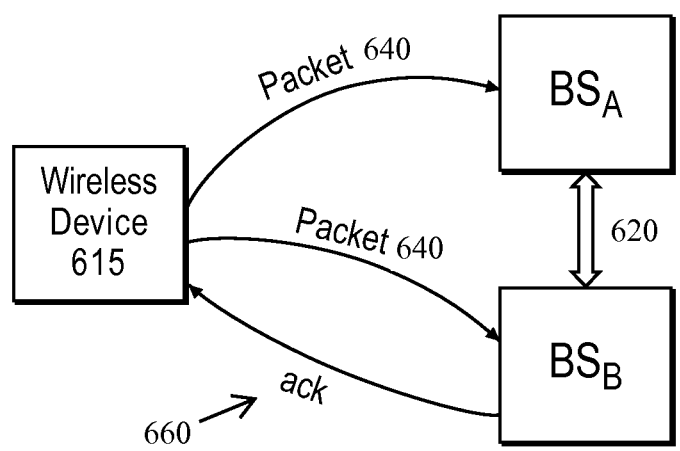
FIG. 6 is illustrative of an example wireless communication organization in accordance with various embodiments.

FIG. 6 is illustrative of an example wireless communication organization 600, in accordance with various embodiments. In example wireless communication organization 600, two receivers may receive a packet included in a multicast signal and one of the plurality of receivers may send an acknowledgment to the sender in accordance with some embodiments of the present disclosure. As shown, a receiver at a base station A ($BS_A$) and a receiver at a base station B ($BS_B$) may be communicatively coupled using high speed optical, wireless or some other high speed connection topology 620. In some embodiments, receivers at base station A and base station B may receive similar packets 640 consistent with an original packet as indicated by an ECC. However, base station B in FIG. 6 may have a preferred reverse connection to the wireless device 615. Thus, in the embodiment shown, a transmitter at base station B may send an acknowledgement ("ack") 600 to the wireless device 615.

Figure 7:
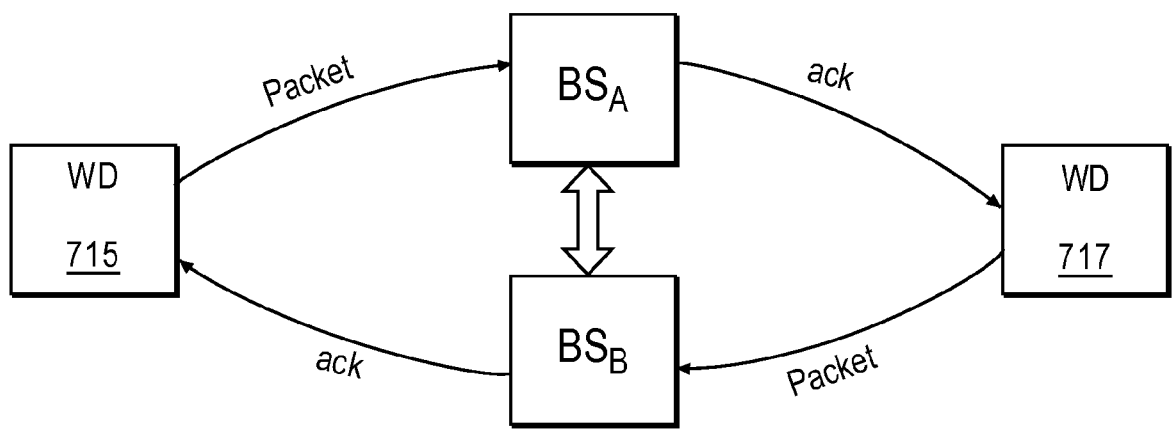
FIG. 7 is illustrative of another example wireless communication organization in accordance with various embodiments.

FIG. 7 is illustrative of another example wireless communication organization 700 in accordance with various embodiments of the present disclosure. In embodiments of FIG. 7, transmitters at each base station can be configured to send an acknowledgment for a packet from a preferred base station whether or not a receiver at the preferred base station has received the packet included in the multicast signal. Thus, wireless communication organization 700 may be similar to the wireless communication organization 600 except that a base station B ($BS_B$) does not receive a packet directly from a first wireless device (WD) 715, and $BS_B$ may send an acknowledgment to wireless device (WD) 715 on behalf of base station A ($BS_A$) in accordance with some embodiments of the present disclosure. Additionally, in the embodiments shown, a second wireless device (WD) 717 may transmit a packet to a receiver at base station B, and may receive an acknowledgement from a transmitter at base station A.

In some embodiments, the links may be selected so that either a reception rate ("RR") or other relevant communication parameters may be modified. In various embodiments, a plurality of wireless devices may be matched to a single receiver or a plurality of receivers. In some embodiments, two or more receivers at respective base station A and B may transmit acknowledgments ("Acks") in different as well as non-consecutive time slots.

Figure 8:
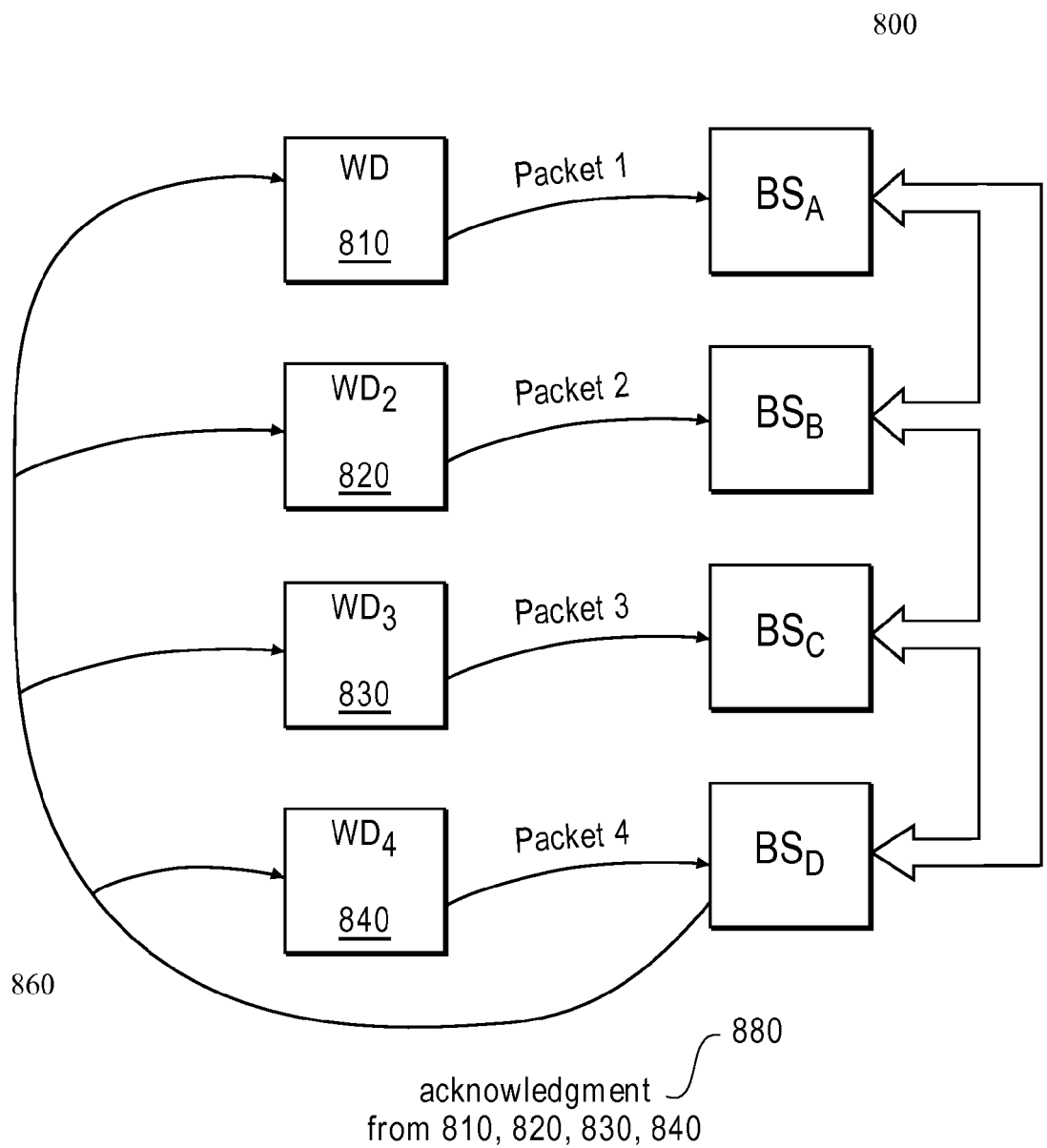
FIG. 8 is illustrative of another example wireless communication organization in accordance with various embodiments.

FIG. 8 is illustrative of another example wireless communication organization 800 in accordance with various embodiments of the present disclosure. As illustrated, a common or joint acknowledgment may be transmitted from a single receiver location. For example, FIG. 8 may include wireless devices (WDs) 810, 820, 830, and/or 840, which may be coupled to each other by a wireless or wired connection 860. Wireless devices 810, 820, 830, and 840 may each be arranged to transmit a respective packet (e.g., $Packet_1$, $Packet_2$, $Packet_3$, and $Packet_4$) to respective receivers located at corresponding base stations $BS_A$, $BS_B$, $BS_C$, and $BS_D$. Base station D ($BS_D$) may also be arranged to transmit a joint acknowledgement to each of wireless devices 810, 820, 830, and 840, including acknowledgements intended for a respective wireless device 810, 820, 830, and 840 from base stations A-D ($BS_A$ through $BS_D$). In some embodiments, the joint acknowledgement may also include information about a status of the receivers located at the base stations $BS_A$, $BS_B$, $BS_C$, and $BS_D$. In some embodiments, a single base station (e.g., $BS_D$) may be able to use a higher level of transmission power to transmit the joint acknowledgment, than if each base station $BS_A$, $BS_B$, $BS_C$, or $BS_D$, sent its own acknowledgment.

In some embodiments, receivers may be allocated so that a wireless device, such as one or more of wireless devices 810, 820, 830 and/or 840, having a lesser amount of energy, may transmit a signal having a packet to a larger number of receivers so that the wireless device does not have to repeatedly retransmit the packet. For example, one or more of wireless devices 810, 820, 830 and/or 840 may have a lower level of remaining battery life, than some or all of the wireless devices 810, 820, 830 and/or 840. In accordance with embodiments of the disclosure, one or more of wireless devices 810, 820, 830, and/or 840 may transmit a signal having a packet to a larger number of receivers (such as receivers 204, 206, 208, and 210 of FIG. 2) capable to receive a higher quality signal so that the wireless device does not have to repeatedly retransmit the packet.

In some implementations, receivers may be allocated using an estimated or collected reception rate. For example, a wireless device having a lower reception rate may be assigned to a receiver or additional receiver having a higher reception rate for the wireless device. In some embodiments, a receiver or wireless device may be configured to change an order of transmission of a signal and/or acknowledgment according to changes in the quality of communication channels, or location of the receivers, or changes in a size of available buffer space. In some embodiments, a receiver may be included in a transceiver. Additionally, in some embodiments, a particular receiver at a particular location and may be selected so that a quality of service may be maintained. In some embodiments, an acknowledgement may also be received at a plurality of receivers.

In some embodiments, periodic allocation of a receiver (or receivers) to a particular wireless device or wireless devices may be undertaken. In various embodiments, either distributed control or centralized control may be utilized. In distributed control embodiments, a receiver may be arranged to communicate with a subset of receivers. In centralized control embodiments, some or all of the receivers may be arranged to communicate or consult with each other. In some embodiments, an optimization or attempted optimization may be performed using stochastic linear programming, stochastic convex programming, or stochastic non-linear programming. In various embodiments, communication parameters, such as packet size, ECC, direction of an antenna, emitted power etc. may be conveyed between receivers.

Figure 9:
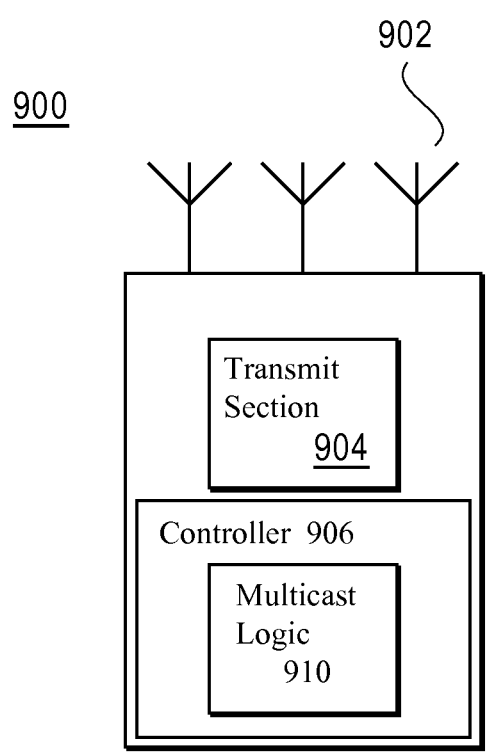
FIG. 9 illustrates an example wireless device in accordance with some embodiments.

Next, FIG. 9 illustrates an example wireless device 900 arranged in accordance with some embodiments of the present disclosure. In various embodiments, wireless device 900 may be one of, for example, a cellular phone, a personal digital assistant (PDA), a laptop computer, a media player, or some other suitable device capable to transmit and/or receive RF signals. In some embodiments, wireless device 900 may be a mobile radio frequency identifier (RFID) device or other low power device. As shown, wireless device 900 may include a plurality of antenna elements 902, a transmit section or unit 904, and a controller 906. In some embodiments, one or more of the plurality of antenna elements 902 may include a directional antenna. In other embodiments, antenna elements 902 may include an omni-directional antenna. In various embodiments, controller 906 may include a one-to-one multicast logic 910 arranged to control the transmit unit 904 to transmit a multicast signal to be received at a plurality of receivers, the multicast signal to be eventually transmitted as a unicast signal by a transmitter to a recipient.

In some embodiments, transmit unit 904 may include a radio unit for transmitting and/or receiving RF signals to and/or from a plurality of receivers such as receivers 204, 206, 208, and 210 of FIG. 2. In some embodiments, the controller 906 may be configured to control the transmit unit 904 to transmit the multicast signal 214 at an energy level lower than an energy level employed if the multicast signal were to be received at a single receiver. In some embodiments, the multicast signal may be wirelessly transmitted at a power level that is based upon a number of receivers in the plurality. In some embodiments, the higher the number of receivers in the plurality, the lower the power level may be. In some embodiments, where wireless device 900 may be an RFID device, the controller 906 may be configured to control the transmit unit 904 to multicast an RFID. In various embodiments, receivers such as receivers 204, 206, 208, and 210 may be pre-positioned at a plurality of locations and arranged to detect an RFID or other multicast signal.

In various embodiments, multiple-input-multiple-output (MIMO) transceivers may be included in the wireless device such as wireless device 900. Furthermore, in various embodiments, receivers 204, 206, 208, and 210 may comprise MIMO receivers. In various embodiments, the wireless device or receivers such as receivers 204, 206, 208, and 210 may include software or cognitive radio receivers. Further, in some embodiments, a single antenna element, rather than a plurality of antenna elements 902, may also be coupled to transmit unit 904.

Figure 10:
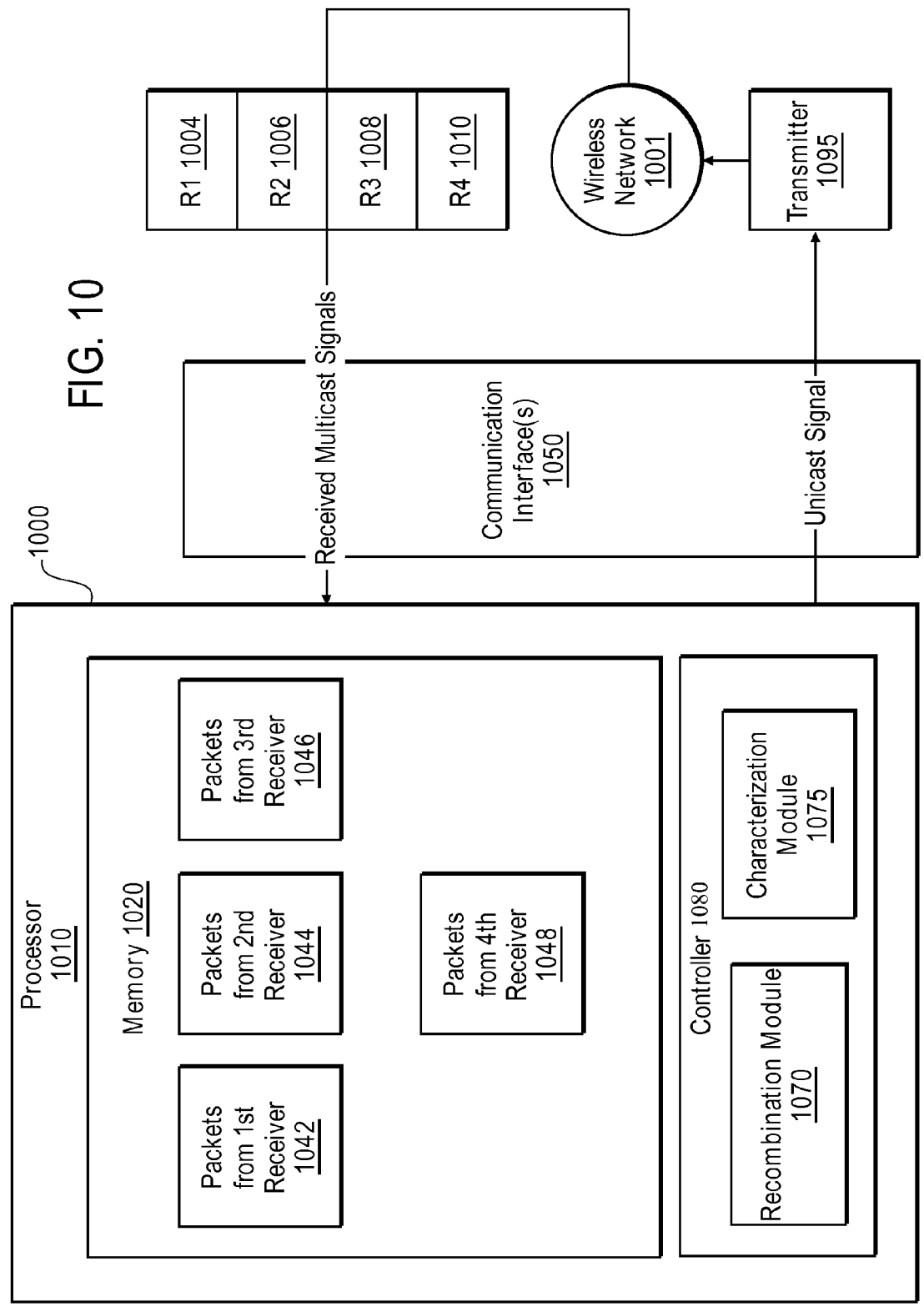
FIG. 10 illustrates an example computing system configured in accordance with various embodiments, all arranged in accordance with the present disclosure.

FIG. 10 illustrates an example computing system 1000 configured in accordance with various embodiments. Computing system 1000 may comprise a processor 1010 and memory 1020 integrated with or coupled to processor 1010. In the illustrated example, one or more communication interfaces 1050 may include one or more wired or wireless communication interfaces 1050 configured for coupling computing system 1000 to a plurality of receivers 1004, 1006, 1008, and 1010, which may be arranged to receive a plurality of received multicast signals received from a sender. In various embodiments, memory 1020 may be arranged to store packets 1042, 1044, 1046, and 1048 included in the plurality of received multicast signals and received at respective receivers 1004, 1006, 1008, and 1010. Computing system 1000 may also include a controller 1080 including a recombination module 1070 and/or a characterization module 1075. Recombination module 1070 may be configured to recombine the plurality of received multicast signals to recover an intended unicast signal for a recipient in accordance with the present disclosure. The recovered intended unicast signal may be transmitted via one or more communication interfaces 1050 and a transmitter 1095 to a recipient via wireless communications network or wireless network 1001. In some embodiments, characterization module 1075 in controller 1080 may be configured to characterize a wireless link of the wireless network 1001 based at least in part on the recovered intended unicast signal in accordance with the present disclosure. The characterized links may include one or more physical links. In some embodiments, characterization of the links may be performed using data collection and non-parametric statistical techniques.

Thus, in some embodiments, controller 1080 may be configured to combine two or more differently corrupted versions of a packet stored in memory 1020 to recover a packet, also referred to as original packet. The controller 1080 may also be configured to modify one or more communication parameters based at least in part on a recovered signal. In some embodiments, the controller 1080 may be configured to perform off-line data traces, on-line data traces, or a Monte Carlo simulation prior to undertaking modification of communications parameters of a multicast transmission. As discussed previously, each of the plurality of receivers 1004, 1006, 1008, and 1010 may be located at separate locations. In some embodiments, controller 1080 may be configured to determine a new location for one or more of the plurality of receivers 1004, 1006, 1008, and 1010 based at least in part of the recovered packet included in a signal.

In various embodiments, processor 1010 may be a general-purpose processor and memory 1020 may be a hard drive, solid-state drive, Random Access Memory (RAM), or other forms of memory. In such embodiments, recombination module 1070 and characterization module 1075 may represent a plurality of programming instructions stored within memory 1020 or other memory and configured to program processor 1010 to function as described within this specification. In some embodiments, processor 1010 may be an Application-specific Integrated Circuit (ASIC), a field-programmable gate array (FPGA), or other logic device having specific functions built or programmed directly into it. In some embodiments, recombination module 1070 or characterization module 1075 may be logical components within processor 1010.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for conducting a one-to-one communication between a sender and a recipient, the method comprising:
    receiving an instance of a multicast signal at a first receiver of a plurality of receivers disposed at a plurality of locations, wherein separate instances of the multicast signal are received by each of the plurality of receivers from the sender, via parallel channels through an associated antenna, with at least two of the separate instances differing in a reception quality of the multicast signal; and
    forwarding, for reception by at least one processor, by the first receiver, the received instance of the multicast signal for recombining with other instances of the multicast signal received by others of the plurality of receivers to recover the one-to-one communication signal;
    wherein the at least one processor is part of the first receiver and wherein the recombining comprises combining by the at least one processor two or more differently corrupted versions of a packet from two or more separate instances of the multicast signal to recover the packet.

2. The method of claim 1 wherein the receiving comprises receiving the instance of the multicast signal wirelessly transmitted at a power level that is based upon a number of receivers in the plurality of receivers that are adapted to receive the multicast signal.

3. The method of claim 1 further comprising sending, by the first receiver, an acknowledgement that the instance of the multicast signal has been received.

4. The method of claim 1 further comprising characterizing by a processor that is part of the first receiver a wireless link based at least in part on the recovered one-to-one communication signal.

5. The method of claim 1 further comprising modifying by a processor that is part of the first receiver one or more communication parameters of the first receiver based at least in part on the recovered one-to-one communication signal.

6. The method of claim 1 further comprising performing off-line data traces, on-line data traces or Monte Carlo simulation by a processor that is part of the first receiver to optimize quality of different instances of the multicast signal received by the plurality of receivers.

7. The method of claim 1 further comprising determining a new location for the first receiver based at least in part on the recovered one-to-one communication signal.

8. An apparatus for processing a plurality of instances of a multicast signal to recover a one-to-one communication, the apparatus comprising:
one or more communication interfaces configured to receive the plurality of instances of the multicast signal; and
a controller configured to receive the plurality of received instances of the multicast signal from the one or more communication interfaces and to recombine the received plurality of received instances of the multicast signal to recover the one-to-one communication by recombining two or more differently corrupted versions of a packet from two or more instances of the multicast signal to recover the packet.

9. The apparatus of claim 8 wherein the controller is further configured to characterize a wireless link based at least in part on quality of the recovered one-to-one communication.

10. The apparatus of claim 8,
wherein the one or more communication interfaces are further configured to receive the plurality of instances of the multicast signal from a plurality of differently located receivers, wherein each receiver of the plurality of differently located receivers receives a corresponding instance of the multicast signal via an associated antenna; and
wherein the controller is further configured to recombine packets of the instances of the multicast signal received correctly by at least one receiver of the plurality of receivers to recover the one-to-one communication.

11. The apparatus of claim 8,
wherein the one or more communication interfaces are further configured to receive the plurality of instances of the multicast signal from a plurality of differently located receivers, wherein each receiver of the plurality of differently located receivers receives a corresponding instance of the multicast signal via an associated antenna; and
wherein the controller is further configured to optimize one or more communication parameters of the plurality of receivers based at least in part on quality of the recovered one-to-one communication.

12. The apparatus of claim 8 wherein the controller is further configured to perform off-line data traces, on-line data traces, or Monte Carlo simulation to determine transmission parameters for a transmission of the multicast signal.

13. The apparatus of claim 8,
wherein the one or more communication interfaces are further configured to receive the plurality of instances of the multicast signal from a plurality of differently located receivers, wherein each receiver of the plurality of differently located receivers receives a corresponding instance of the multicast signal via an associated antenna; and
wherein the controller is further configured to determine a new location for one of the plurality of differently located receivers based at least in part on quality of the recovered one-to-one communication.

14. The apparatus of claim 8,
wherein the one or more communication interfaces are further configured to receive the plurality of instances of the multicast signal from a plurality of differently located receivers, wherein each receiver of the plurality of differently located receivers receives a corresponding instance of the multicast signal via an associated antenna; and
wherein the one or more communication interfaces comprise one or more wired or wireless communication interfaces configured to couple the apparatus to the plurality of differently located receivers.

15. A system for processing a plurality of instances of a multicast signal to recover a one-to-one communication, the system comprising:
a plurality of receivers disposed at a plurality of locations for receiving the plurality of instances of the multicast signal through a corresponding plurality of antennas;
one or more communication interfaces coupled to the plurality of receivers to receive the plurality of instances of the multicast signal;
a controller coupled to the one or more communication interfaces, and configured to receive the plurality of received instances of the multicast signal and to recombine the received plurality of received instances of the multicast signal to recover the one-to-one communication, including recombination of two or more differently corrupted versions of a packet from two or more instances of the multicast signal to recover the packet.

16. The system of claim 15 wherein the controller further includes a characterization module to characterize a wireless link based at least in part on quality of the recovered one-to-one communication.

* * * * *